(12) United States Patent
Alpert et al.

(10) Patent No.: US 9,060,250 B2
(45) Date of Patent: Jun. 16, 2015

(54) DEVICE, SYSTEM AND METHOD OF LOCATION ESTIMATION OF A MOBILE DEVICE

(75) Inventors: Yaron Alpert, Hod Hasharon (IL); Haim Rochberger, Tel Mond (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,469

(22) PCT Filed: Mar. 29, 2012

(86) PCT No.: PCT/US2012/031318
§ 371 (c)(1),
(2), (4) Date: Jun. 27, 2013

(87) PCT Pub. No.: WO2013/147822
PCT Pub. Date: Oct. 3, 2013

(65) Prior Publication Data
US 2013/0337834 A1    Dec. 19, 2013

(51) Int. Cl.
| | |
|---|---|
| H04W 4/02 | (2009.01) |
| H04W 64/00 | (2009.01) |
| H04W 88/02 | (2009.01) |
| H04W 4/00 | (2009.01) |
| H04W 4/20 | (2009.01) |

(52) U.S. Cl.
CPC .............. *H04W 4/025* (2013.01); *H04W 64/00* (2013.01); *H04W 88/02* (2013.01); *H04W 4/008* (2013.01); *H04W 4/20* (2013.01)

(58) Field of Classification Search
USPC ...................................................... 455/456.1
See application file for complete search history.

(56) References Cited

U.S. PATENT DOCUMENTS

| | | |
|---|---|---|
| 5,617,100 A | 4/1997 | Akiyoshi et al. |
| 6,154,656 A | 11/2000 | Camp, Jr. |
| 2003/0101225 A1 | 5/2003 | Han et al. |
| 2004/0172418 A1 | 9/2004 | Dorum et al. |
| 2006/0230137 A1 | 10/2006 | Gare et al. |
| 2008/0082225 A1 | 4/2008 | Barrett |
| 2008/0244184 A1 | 10/2008 | Lewis et al. |
| 2008/0249713 A1 | 10/2008 | Sessions |

(Continued)

FOREIGN PATENT DOCUMENTS

| | | |
|---|---|---|
| JP | 2010232944 | 10/2010 |
| KR | 20060092894 | 8/2006 |
| WO | 02076118 A1 | 9/2002 |

OTHER PUBLICATIONS

International Search Report and Written Opinion for PCT/US2012/031318, mailed on Nov. 28, 2012; 9 pages.

(Continued)

*Primary Examiner* — Diane Mizrahi
(74) *Attorney, Agent, or Firm* — Shichrur & Co.

(57) ABSTRACT

Some demonstrative embodiments include devices, systems and/or methods of location estimation of a mobile device. For example, a device may include a location error corrector to provide location data to at least one application executed by the device, the location data indicating an estimated location of the device, which is based on location information from at least one location-information generator; to receive from the application error feedback information indicating an error in the estimated location; to determine a correction based on the error feedback information; and to provide to the application corrected location data based on the correction.

24 Claims, 4 Drawing Sheets

(56) References Cited

U.S. PATENT DOCUMENTS

| | | | |
|---|---|---|---|
| 2009/0189811 A1 | 7/2009 | Tysowski et al. | |
| 2009/0287415 A1 | 11/2009 | Buerger et al. | |
| 2010/0295726 A1 | 11/2010 | Tann | |
| 2011/0077862 A1 | 3/2011 | Huang et al. | |
| 2012/0136849 A1 | 5/2012 | Niranjan et al. | |
| 2013/0030700 A1* | 1/2013 | Miller et al. | 701/500 |
| 2013/0238857 A1 | 9/2013 | Daniel et al. | |
| 2013/0261964 A1* | 10/2013 | Goldman et al. | 701/500 |
| 2014/0003542 A1* | 1/2014 | Zukerman et al. | 375/259 |

OTHER PUBLICATIONS

International Search Report and Written Opinion for PCT/US2013/029350, mailed on Jun. 2, 2013; 14 pages.

OMA Secure User Plane Location Architecture, Candidate Version 2.0—May 27, 2011; Open Mobile Alliance OMA-AD-SUPL-V2_0-20110527-C; 54 pages.

Geolocation API Specfication, W3C Candidate Recommendation Sep. 7, 2010. Andrei Popescu, Google, Inc.; 14 pages.

International Search Report and Written Opinion for PCT/US2012/032844, mailed on Aug. 23, 2013; 12 pages.

Office Action for U.S. Appl. No. 13/533,006, mailed on Apr. 11, 2014, 41 pages.

International Preliminary Report on Patentability for PCT Application No. PCT/US2013/029350, mailed on Sep. 18, 2014, 10 pages.

International Preliminary Report on Patentability for PCT Application No. PCT/US2012/032844, mailed on Oct. 23, 2014, 9 pages.

Final Office Action for U.S. Appl. No. 13/533,006, mailed on Oct. 6, 2014, 33 pages.

International Preliminary Report on Patentability for PCT Application No. PCT/US2012/031318, mailed on Oct. 9, 2014, 6 pages.

Office Action for U.S. Appl. No. 13/533,006, mailed on Dec. 29, 2014, 54 pages.

* cited by examiner

DEVICE, SYSTEM AND METHOD OF LOCATION ESTIMATION OF A MOBILE DEVICE

CROSS REFERENCE

This application is a National Phase Application of PCT International Application No. PCT/US2012/031318, International Filing Date Mar. 29, 2012, the entire disclosure of which is incorporated herein by reference.

BACKGROUND

An application executed by a mobile device may use location data received from one or more location data origin transmitters to determine an estimated location of the mobile device. For example, a road navigation application may use location data, which may be received, for example, from one or more satellites of a Global Navigation Satellite System (GNSS).

Some of the location data, e.g., location fix (fix) data, may have a relatively low level of accuracy, e.g., an accuracy of about 5-200 meters. For example, the low level of accuracy may result from satellite geometry, satellite orbit, clock error, and the like.

The application may use local error correction methods, which may be executed by the application. For example, the road navigation application may receive the location fix data from the GNSS system, and may utilize a local error correction method, which may compare the location fix data to a geographical database, in order to determine inconsistency. For example, the error corrector may assume that the mobile device is in a vehicle, which is assumed to be on a road. If the location fix data does not position the mobile device on the road, for example, on a field or in an offset from the road, the error corrector of the application may correct the location fix to be on the road.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (IEEE 802.11-2007: Standard for Information technology—Telecommunications and information exchange between systems—Local and metropolitan area networks—Specific requirements, Part II: Wireless LAN Medium Access Control (MAC) and Physical Layer (PHY) Specifications—June 2007), 802.11n ("IEEE 802.11n-2009—Amendment 5: Enhancements for Higher Throughput. IEEE-SA. 29 Oct. 2009"), 802.11ac ("Very High Throughput <6 Ghz"), 802.11 task group ad (TGad) ("Very High Throughput 60 GHz"), and/or future versions and/or derivatives thereof, devices, and/or networks operating in accordance with IEEE 802.16 standards ("the 802.16 standards"), e.g., including 802.16 (IEEE-Std 802.16, 2004 Edition, Air Interface for Fired Broadband Wireless Access Systems), 802.16d, 802.16e (IEEE-Std 802.16e, 2005 Edition, Physical and Medium Access Control Layers for Combined Fixed and Mobile Operation in Licensed Bands), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Global Navigation Satellite System (GNSS) device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, Bluetooth (BT) device, a Near Field Communication (NFC) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5 G, 3G, 3.5 G, Enhanced Data rates for GSM Evolution (EDGE), Bluetooth (BT), Near Field Communication (NFC), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Figure 1:
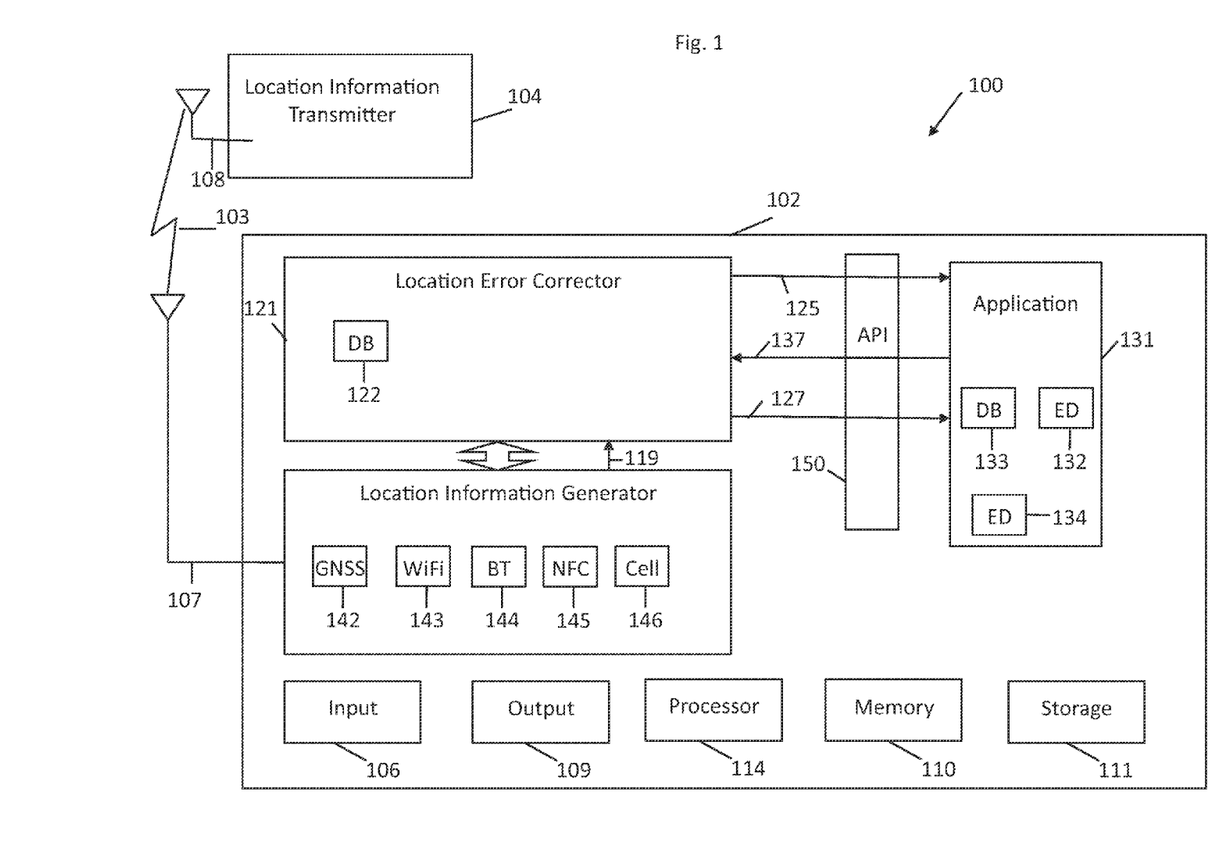
FIG. 1 is a schematic block diagram illustration of a system, in accordance with some demonstrative embodiments.

Reference is now made to FIG. 1, which schematically illustrates a block diagram of a wireless communication system 100, in accordance with some demonstrative embodiments.

In some demonstrative embodiments, system 100 may include a wireless communication device 102 capable of receiving wireless communication signals including location information 113 related to a location of device 102. Device 102 may receive location information 113 over a wireless communication medium 103, e.g., via one or more antennas 107.

In some demonstrative embodiments, wireless medium 103 may include for example, a Radio Frequency (RF) channel, a WiFi channel, a Bluetooth channel, a cellular channel, a GNSS Channel, a NFC channel, an audio channel, a video channel, and the like.

In some demonstrative embodiments, system 100 may include at least one device 104 configured to transmit the wireless communication signals including location information 113 via one or more antennas 108.

For example, device 104 may include one or more of a location data origin transmitter, e.g., satellites of the GNSS, one or more Wireless Fidelity (WiFi) hotspots or AP's, one or more Bluetooth devices, one or more cellular devices, one or more NFC devices, and the like.

In some demonstrative embodiments, antennas 108 and/or 107 may include any type of antennas suitable for transmitting and/or receiving wireless communication signals, blocks, frames, transmission streams, packets, messages and/or data. Types of antennas that may be used for antennas 108 and/or 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 108 and/or 107 may implement transmit and receive functionalities using separate transmit and receive antenna elements. In some embodiments, antennas 108 and/or 107 may implement transmit and receive functionalities using common and/or integrated transmit/receive elements.

In some demonstrative embodiments, location information 113 may be related, for example, to a location of device 104, and/or to a relative location between device 102 and device 104.

In some demonstrative embodiments, device 102 may receive location information 113 and may determine a location of device 102 based on location information 113.

In some demonstrative embodiments, device 102 may include at least one location information generator 141, configured to provide location information 119 indicating an estimated location of device 102 based on location information 113. For example, location information generator 141 may estimate the location of device 102 based on the location of device 104, for example, by calculating a relative location between device 102 and device 104.

In some demonstrative embodiments, location information generator 141 may include one or more of a GNSS receiver 142 configured to estimate the location of device 102 based on location information received from at least one GNSS device, e.g., satellites; a WiFi location information generator 143 configured to estimate the location of device 102 based on location information received from at least one WiFi device, e.g., a WiFi hot spot or AP; a Bluetooth location information generator 144 configured to estimate the location of device 102 based on location information received from at least one BT device; a NFC location information generator 145; configured to estimate the location of device 102 based on location information received from at least one NFC device; a microphone-based location information generator; a camera-based location information generator; a sensor-based location information generator, a cellular location information generator 146 configured to estimate the location of device 102 based on location information received from at least one cellular device, e.g., a cellular antenna and/or cellular operator, and the like, In some demonstrative embodiments, device 102 may include at least one application 131 executed by device 102.

In some demonstrative embodiments, application 131 may be implemented as part of an Operating System (OS) of device 102, as part of a real time operating system, e.g., an ARM Real Time Operating System (ARTOS), or as another application with or without an OS.

In some demonstrative embodiments, application 131 may use and/or process location information 119. For example, application 131 may be a road/terrain navigation application, which may use location information 119 in order to navigate a vehicle on a road/terrain. In another example, application 131 may be a consumer application, a social application, an entertainment application, a sport application, e.g., a running application, a bicycle tour application, and the like, a location based recommendation application, e.g., a restaurant recommendation application, a touristic location recommendation application, an entertainment recommendation application and the like, a tracking application, e.g., a fleet management application, a delivery management application, a transportation management application, and the like.

In some demonstrative embodiments, location information 119, e.g., as estimated by location information generator 141, may have a relatively low level of accuracy due to various reasons.

In one example, location information 119 may have a relatively low level of accuracy due to satellite geometry, e.g., a relative position between satellites as viewed by GNSS receiver 142. For example, when GNSS receiver 142 views the satellites clustered in a certain area it may be difficult to estimate an accurate location of GNSS receiver 142, whereas, when the satellites are distributed over a wide area the estimated location of GNSS receiver 142 may be more accurate.

In another example, location information 119 may have a relatively low level of accuracy due to atmospheric effects. For example, the troposphere and ionosphere may affect the propagation speed of the GNSS satellite signals, which may affect the calculation of the estimated location by GNSS receiver 142.

In yet another example, location information 119, may have a relatively low level of accuracy due to reflections of GNSS satellite signals from objects, e.g., buildings and the like, which may cause several of the GNSS satellite signals to reach GNSS receiver 142 at different times, and may affect the calculation of the estimated location.

In some demonstrative embodiments, device 102 may be configured to correct location information 119, independently of application 131, e.g., as described below.

In some demonstrative embodiments, device 102 may include a location error corrector 121 configured to provide location data 125 to application 131. Location data 125 may indicate an estimated location of device 102, which is based on the location information 119 from location information generator 141. Location error corrector 121 may receive from application 131 error feedback information 137 indicating an error in the estimated location, may determine a correction based on error feedback information 137 and may provide to application 131 corrected location data 127 based on the correction, e.g., as described in detail below.

In some demonstrative embodiments, location error corrector 121 may determine location data 125 indicating the estimated location of device 102 based on location information 119 received from location information generator 141.

In some demonstrative embodiments, application 131 may include a location Error Detector (ED) 132 configured to detect errors in location data 125.

In some demonstrative embodiments, error detector 132 may detect the errors in the estimated location of device 102 based on one or more location error detection methodologies. For example, application 131 may include a database (DB) 133 including maps and/or other geographical data, e.g., information relating to buildings, roads, areas of interest, and the like. Error detector 132 may access DB 132 and may map the estimated location of device 102 into a corresponding location in a map of DB 133, e.g., to determine a map fix, and may look for inconsistencies between the map fix and the geographical data.

For example, device 102 may be a mobile device, e.g., a GPS Mobile device, residing in a vehicle, and application 131 may be a road navigation application. Accordingly, error detector 132 may include an algorithm, which may assume that the estimated location of device 102 should be, most of the time, on a road. If the map fix of device 102 is not determined to be on a road, e.g., on a river, field, or in a distance from a road, error detector 132 may detect an error in the estimated location of device 102.

In some demonstrative embodiments, application 131 may include an application Error Corrector (EC) 134 configured to estimate and evaluate the detected errors in the estimated location of device 102 and to correct the errors accordingly. For example, error corrector 134 may identify that error detector 132 is repeatedly detecting the same error in the estimated location of device 102, for example, indicating that a map fix is not on a road, e.g., in a distance from a road. Error corrector 134 may estimate and evaluate the error and, for example, if the repeated error is in a constant offset from the road, error corrector 134 may correct the estimated location of device 102, e.g., by correcting the constant offset and adjusting the map fix in order to place device 102 on the road.

In some demonstrative embodiments, application 131 may determine error feedback information 137 including information indicating the error in the estimated location of device 102. For example, error feedback information 137 may include a detected error in the estimated location of device 102, e.g., as detected by error detector 132, or an estimated error, e.g., as estimated by error corrector 134.

In some demonstrative embodiments, location error corrector 121 may process error feedback information 137 and may determine, e.g., based on error feedback information 137, an error correction configured to overcome the detected error.

In one example, location error corrector 121 may detect an error in the GNSS system, indicating that a satellite may not be in a location reported by the satellite. Accordingly, location error corrector 121 may modify a long-term ephemerides parameter of GNSS location information generator 142, e.g., by modifying values indicating estimated positions along an orbit of the satellite.

In another example, location error corrector 121 may detect an error caused by atmosphere layers, e.g., according to whether conditions, solar conditions, and the like. Accordingly, location error corrector 121 may estimate delays caused by the atmosphere layers and may take into consideration the delays, when calculating the estimated location of device 102.

In some demonstrative embodiments, location error corrector 121 may include a DB 122 configured to store information, which may be relevant to correct the estimated location of device 102. For example, DB 122 may store the error correction parameters, which may be relevant to the estimated location of device 102. For example, DB 122 may store modified values of positions of a satellite having an ephemerides error.

In some demonstrative embodiments, location error corrector 121 may control location information generator 141 based on the error correction. For example, error corrector 121 may modify one or parameters of location information generator 141, e.g., the long-term ephemerides parameter of GNSS receiver 142.

In some demonstrative embodiments, location information generator 141 may include two or more location information generators. For example, two or more of GNSS receiver 142, WiFi location information generator 143, Bluetooth location information generator 144, NFC location information generator 145, cellular location information generator 146, and the like.

In some demonstrative embodiments, location error corrector 121 may rank a reliability of the location information generators based on error feedback information 137, and may determine location information 125 based on the ranking.

For example, location error corrector 121 may rank the reliability of GNSS receiver 142, WiFi location information generator 143, Bluetooth location information generator 144, NFC location information generator 145 and/or cellular location information generator 146. For example, location error corrector 121 may assign a first (high) reliability ranking to a location information generator having a low rate of errors, and a second (low) reliability ranking, which is lesser than the first reliability ranking, to a location information generator having a high rate of errors.

In some demonstrative embodiments, location error corrector 121 may determine the estimated location of device 102 based on a first location information generator, e.g., GNSS receiver 142, having the high reliability ranking. Location error corrector 121 may switch to use a second, different, location information generator, e.g., BT location information generator 144, if a reliability ranking of the second location information generator becomes higher than the reliability ranking of the first location information generator.

In another example, location error corrector 121 may determine the estimated location of device 102 based on a combination of the location information from two or more location information generators. In one example, location error corrector 121 may combine the location information according to the reliability ranking. For example, location error corrector 121 may select two location information generators, e.g., GNSS receiver 142 and WiFi location information generator 143, having the highest reliability ranking, and may determine the estimated location of device 102 based on a combination of the location information received from the two selected location information generators, e.g., by applying a weighted average to the location information received from the two selected location information generators.

In some demonstrative embodiments, location error corrector 121 may determine corrected location data 127 based on the error correction. For example location error corrector 121 may modify the map location fix of device 102 according to the error correction.

In some demonstrative embodiments, at least one application 131 may include at least first and second applications. Location error corrector 121 may receive error feedback information 137 from the first application and may provide to the second application corrected location 127 based on error feedback information 137.

In one example, the first application may be capable of detecting errors in location information 119 while the second application may not be capable of detecting the errors. For example, the first application may include a road navigation application and the second application may include a social application, which may not have location error detections and error corrections capabilities. In another example, the second application may be at a power save mode, which may not enable determining the errors. The first application may send error feedback information 137 to location error corrector 121, location error corrector 121 may determine a correction based on error feedback information 137 from the first application, and may provide corrected location data 127 to be utilized by the second application.

In some demonstrative embodiments, location error corrector 121 may cause application 131 to wake up from a power save mode, to provide error feedback information 137, and to return back to the power save mode. For example, application 131 may include a map DB, and location error corrector 121 may wake up application 131 in order to map location information from location information generator 141 into a corresponding map location in the map DB, to check for inconsistencies between the map fix and the map DB, and to provide error feedback information 137. For example, location error corrector 121 may use error feedback information 137, in order to check a reliability of location information generator 141.

In some demonstrative embodiments, device 102 may utilize an interface in order to communicate and to transfer data between one or more elements of device 102, e.g., application 131 and location error corrector 121.

For example, device 102 may include an Application Programming Interface (API) 150 configured to transfer data between application 131 and location error corrector 121. For example, API 150 may transfer location data 125 from location error corrector 121 to application 131; error feedback information 137 from application 131 to location error corrector 121, and corrected location data 127 from location error corrector 121 to application 131.

In some demonstrative embodiments, location error corrector 121 may improve an accuracy of the estimated location of device 102, for example, by ranking the plurality of location information generators 141, by using a combination of one or more location information generators 141 and/or by modifying the parameters of location information generator 141, e.g., as described above.

In some demonstrative embodiments, location error corrector 121 may store in DB 122 information relating to a position of location data origin transmitter 104, e.g., a satellite. Location error corrector 121 may utilize the stored information to determine a position of location data origin transmitter 104 during an acquisition and tracking of location data origin transmitter 104. Accordingly, location error corrector 121 may use more accurate information on the position of location data origin transmitter 104 to reduce an acquisition time of location data origin transmitter 104, and/or to reduce a search interval, which may be used to track location data origin transmitter 104.

For example, location error corrector 121 may store in DB 122 one or more parameters e.g., long-term ephemerides, relating to a position of a satellite indicating a location of the satellite along a satellite orbit, which may give better and accurate estimation on the position of the satellite.

In some demonstrative embodiments, location error corrector 121 may improve a power utilization of device 102 due to the reduced acquisition time and the reduced search interval.

In some demonstrative embodiments, location error corrector 121 may perform some of the operations performed by application 131, e.g., location error detection and correction. Accordingly, location error corrector 121 may enable application 131 to be in the power save mode for a longer period of time.

In some demonstrative embodiments, device 102 may include, or may be included as part of a mobile or portable device, for example, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may include, for example, one or more of a processor 114, an input unit 106, an output unit 109, a memory unit 110, and a storage unit 111. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication device 102, of application 131, and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 111 includes, for example, a hard disk drive, a floppy disk drive, a Compact Disk (CD) drive, a CD-ROM drive, a DVD drive, or other suitable removable or non-removable storage units. Memory unit 110 and/or storage unit 111, for example, may store data processed by wireless communication device 102. For example, memory 110 and/or storage unit 111 may store instructions resulting in application 131.

Figure 2:
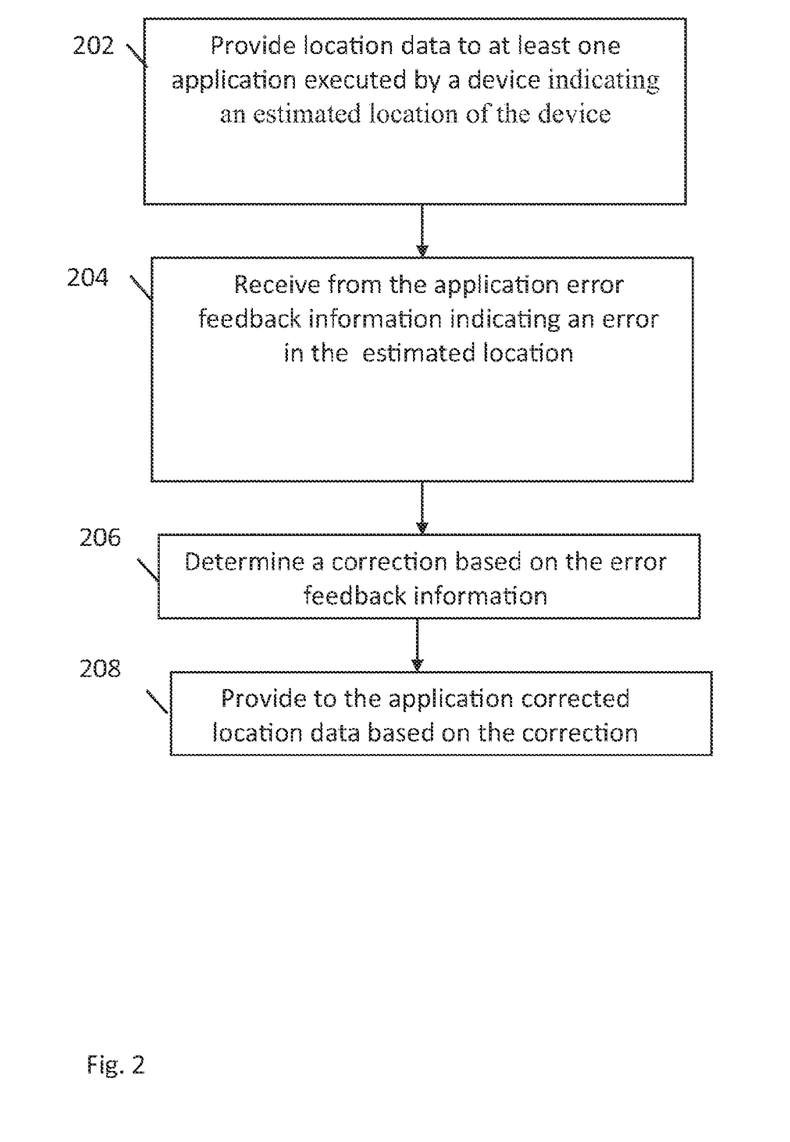
FIG. 2 is a schematic flow chart illustration of a method of correcting a location error, in accordance with some demonstrative embodiments.

Reference is made to FIG. 2, which schematically illustrates a method of estimating a location of a mobile device, in accordance with some demonstrative embodiments. In some embodiments, one or more of the operations of the method of FIG. 2 may be performed by any suitable wireless communication system, e.g., system 100 (FIG. 1) and/or wireless communication device, e.g., device 102 (FIG. 1).

As indicated at block 202, the method may include providing location data to at least one application executed by a device, the location data indicating an estimated location of the device, which is based on location information from at least one location-information generator. For example, location error corrector 121 (FIG. 1) may provide location data 125 (FIG. 1) to application 131 indicating an estimated location of device 102 (FIG. 1) based on location information 119 (FIG. 1) from location information generator 141 (FIG. 1), e.g., as described above.

As indicated at block 204, the method may include receiving from the application error feedback information indicating an error in the estimated location. For example, location error corrector 121 (FIG. 1) may receive from application 131 (FIG. 1) error feedback information 137 (FIG. 1) indicating an error in the estimated location, e.g., as described above.

As indicated at block 206, the method may include determining a correction based on the error feedback information. For example, location error corrector 121 (FIG. 1) may determine the correction based on error feedback information 137 (FIG. 1), e.g., as described above.

As indicated at block 208, the method may include providing to the application corrected location data based on the correction. For example, location error corrector 121 may provide to application 131 (FIG. 1) corrected location data 127 (FIG. 1) based on the correction, e.g., as described above.

Figure 3:
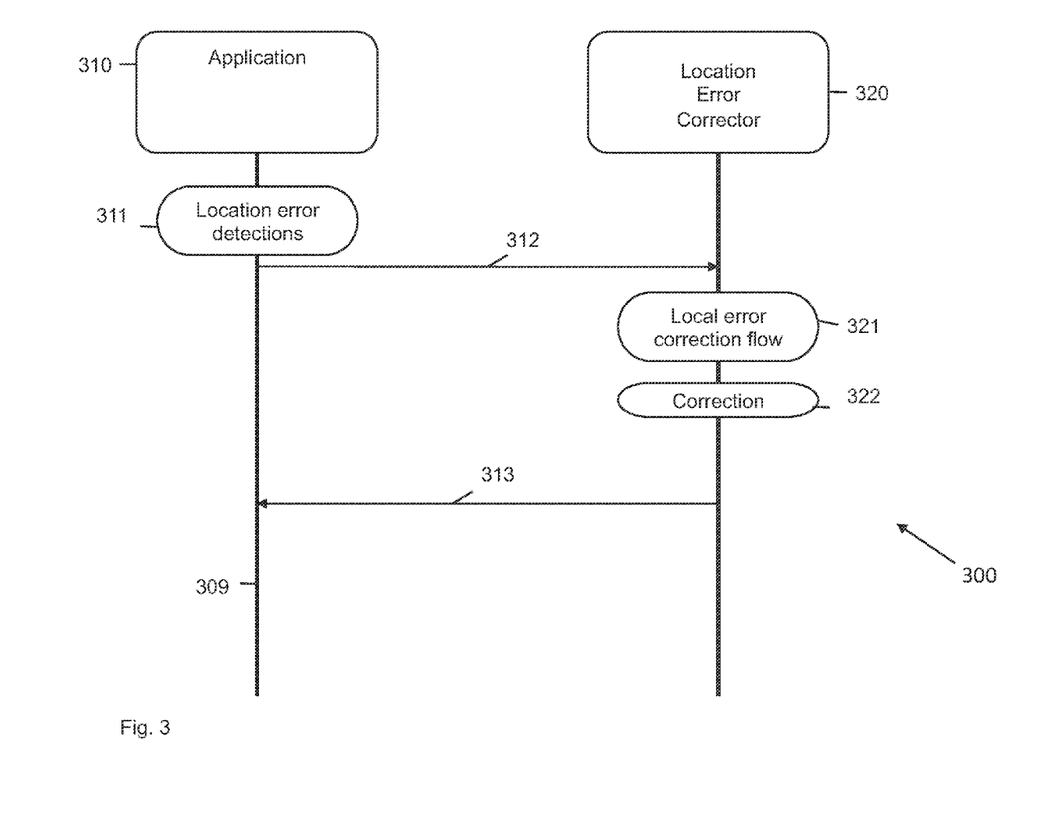
FIG. 3 is a schematic sequence diagram of operations and interactions between an application and a location error corrector, in accordance with some demonstrative embodiments.

Reference is now made to FIG. 3, which schematically illustrates a sequence diagram 300, which demonstrates operations and interactions between an application 310, e.g., application 131 (FIG. 1), and a location error corrector 320, e.g., location error corrector 121 (FIG. 1), along a timeline 309, in accordance with some demonstrative embodiments.

As shown in FIG. 3, application 310 may perform an operation 311 of location error detection and, once a location error is detected, application 310 may send a message 312 to location error corrector 320. Message 312 may include a location error feedback correction. For example, message 312 may include error feedback information 137 (FIG. 1).

As shown in FIG. 3, after receiving message 312, location error corrector 320 may perform an operation 321 of determining a correction 322.

As shown in FIG. 3, after determining correction 322, location error corrector 320 may send to application 310 a message 313 including a location correction. For example, location error corrector 121 (FIG. 1) may send corrected location data 127 to application 131 based on the correction.

Figure 4:
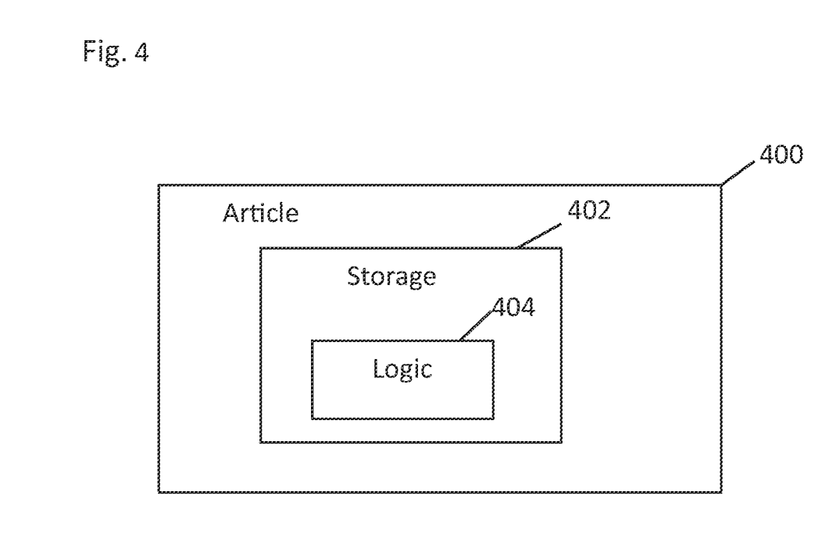
FIG. 4 is a schematic illustration of an article of manufacture, in accordance with some demonstrative embodiments.

Reference is made to FIG. 4, which schematically illustrates an article of manufacture 400, in accordance with some demonstrative embodiments. Article 400 may include a non-transitory machine-readable storage medium 402 to store logic 404, which may be used, for example, to perform at least part of the functionality of location error corrector 121 (FIG. 1) and/or to perform one or more operations of the method of FIG. 2. The phrase "non-transitory machine-readable medium" is directed to include all computer-readable media, with the sole exception being a transitory propagating signal.

In some demonstrative embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
a location error corrector to provide location data to at least first and second applications executed by said device, said location data indicating an estimated location of said device, which is based on location information from at least one location-information generator; to receive from said first application error feedback information indicating an error in said estimated location; to determine a correction based on said error feedback information; and to provide to said second application corrected location data based on said correction.

2. The device of claim 1, wherein said at least one location-information generator comprises at least one generator selected from the group consisting of a global navigation satellite system (GNSS) receiver, a wireless-fidelity (WiFi) location-information generator, a Bluetooth (BT) location-information generator, a cellular location-information generator, a near field communication (NFC) location-information generator, a microphone-based location-information generator, a camera-based location-information generator, and a sensor-based location-information generator.

3. A device comprising:
at least one location information generator; and
a location error corrector to provide location data to at least one application executed by said device, said location data indicating an estimated location of said device, which is based on location information from said at least one location-information generator; to receive from said application error feedback information indicating an error in said estimated location; to determine a correction based on said error feedback information; to provide to said application corrected location data based on said correction; to control said at least one location-information generator based on said correction; and to correct, based on said error feedback information, one or more parameters utilized by said location-information generator for generating said location information.

4. The device of claim 3, wherein said at least one application includes at least first and second applications, and wherein said location error corrector is to receive said error feedback information from said first application, and to provide to said second application corrected location data, which is based on said error feedback information.

5. A device comprising:
a location error corrector to provide location data to at least one application executed by said device, said location data indicating an estimated location of said device, which is based on location information from at least one location-information generator; to cause said application to wake up from a power save mode, to provide error feedback information indicating an error in said estimated location, and to return to said power save mode; to determine a correction based on said error feedback information; and to provide to said application corrected location data based on said correction.

6. The device of claim 5, wherein said location error corrector is to control said at least one location-information generator based on said correction.

7. A device comprising:
a location error corrector to provide location data to at least one application executed by said device, said location data indicating an estimated location of said device, which is based on location information from at least one location-information generator; to receive from said application error feedback information indicating an error in said estimated location; to determine a correction based on said error feedback information; and to provide to said application corrected location data based on said correction; and
an interface to transfer said location data from said location error corrector to said application, to transfer said error feedback information from said application to said location error corrector, and to transfer said corrected location data from said location error corrector to said application.

8. The device of claim 7 comprising said at least one location-information generator, wherein said location error corrector is to control said at least one location-information generator based on said correction.

9. A device comprising:
a location error corrector to provide location data to at least one application executed by said device, said location data indicating an estimated location of said device, which is based on location information from a plurality of location-information generators; to receive from said application error feedback information indicating an error in said estimated location; to rank a reliability of said plurality of location-information generators based on said error feedback information, and to determine said location data based on the ranking; to determine a correction based on said error feedback information; and to provide to said application corrected location data based on said correction.

10. The device of claim 9, wherein said at least one application includes at least first and second applications, and wherein said location error corrector is to receive said error feedback information from said first application, and to provide to said second application corrected location data, which is based on said error feedback information.

11. A method comprising:
providing location data to at least first and second applications executed by a device, said location data indicating an estimated location of said device, which is based on location information from at least one location-information generator;
receiving from said first application error feedback information indicating an error in said estimated location;
determining a correction based on said error feedback information; and
providing to said second application corrected location data based on said correction.

12. The method of claim 11 comprising controlling said at least one location-information generator based on said correction.

13. A method comprising:
providing location data to at least one application executed by a device, said location data indicating an estimated location of said device, which is based on location information from a plurality of location-information generators;
receiving from said application error feedback information indicating an error in said estimated location;
ranking a reliability of said plurality of location-information generators based on said error feedback information, and determining said location data based on the ranking;
determining a correction based on said error feedback information; and
providing to said application corrected location data based on said correction.

14. The method of claim 13, wherein said at least one application includes at least first and second applications, wherein receiving said error feedback information includes receiving from said first application error feedback information indicating an error in said estimated location, and wherein providing said corrected location data includes providing to said second application corrected location data based on said error feedback information.

15. A method comprising:
providing location data to at least one application executed by a device, said location data indicating an estimated location of said device, which is based on location information from at least one location-information generator;
causing said application to wake up from a power save mode, to provide error feedback information indicating an error in said estimated location, and to return to said power save mode;
determining a correction based on said error feedback information; and
providing to said application corrected location data based on said correction.

16. The method of claim 15 comprising controlling said at least one location-information generator based on said correction.

17. A wireless communication system comprising:
a wireless communication device including:
at least one location-information generator to generate location information corresponding to a location of said wireless communication device;
a location error corrector to provide location data to at least first and second applications executed by said wireless communication device, said location data indicating an estimated location of said wireless communication device, which is based on said location information; to receive from said first application error feedback information indicating an error in said estimated location; to determine a correction based on said error feedback information; and to provide to said second application corrected location data based on said correction.

18. The system of claim 17, wherein said at least one location-information generator comprises at least one generator selected from the group consisting of a global navigation satellite system (GNSS) receiver, a wireless-fidelity (WiFi) location-information generator, a Bluetooth (BT) location-information generator, a cellular location-information generator, a microphone-based location-information generator, a camera-based location-information generator, a sensor-based location-information generator, and a near field communication (NFC) location-information generator.

19. A wireless communication system comprising a wireless communication device, the wireless communication device including:
at least one location-information generator to generate location information corresponding to a location of said wireless communication device; and
a location error corrector to provide location data to at least one application executed by said wireless communication device, said location data indicating an estimated location of said wireless communication device, which is based on said location information; to cause said application to wake up from a power save mode, to provide error feedback information indicating an error in said estimated location, and to return to said power save mode; to determine a correction based on said error feedback information; and to provide to said application corrected location data based on said correction.

20. The system of claim 19, wherein said at least one application includes at least first and second applications, and wherein said location error corrector is to receive said error feedback information from said first application, and to provide to said second application corrected location data, which is based on said error feedback information.

21. A wireless communication system comprising a wireless communication device, the wireless communication device including:
at least one location-information generator to generate location information corresponding to a location of said wireless communication device;

a location error corrector to provide location data to at least one application executed by said wireless communication device, said location data indicating an estimated location of said wireless communication device, which is based on said location information; to receive from said application error feedback information indicating an error in said estimated location; to determine a correction based on said error feedback information; and to provide to said application corrected location data based on said correction; and an interface to transfer said location data from said location error corrector to said application, to transfer said error feedback information from said application to said location error corrector, and to transfer said corrected location data from said location error corrector to said application.

22. The system of claim 21, wherein said location error corrector is to control said at least one location-information generator based on said correction.

23. A product including a non-transitory storage medium having stored thereon instructions that, when executed by a machine, result in:

providing location data to at least one application executed by a device, said location data indicating an estimated location of said device, which is based on location information from at least one location-information generator;

causing said application to wake up from a power save mode, to provide error feedback information indicating an error in said estimated location, and to return to said power save mode;

receiving said error feedback information from said application;

determining a correction based on said error feedback information; and providing to said application corrected location data based on said correction.

24. The product of claim 23, wherein the instructions result in controlling said at least one location-information generator based on said correction.

* * * * *